3,046,040
JOINT STRUCTURE FOR TUBING
Forrest E. Luper, Avon, Ill., assignor to Forrest E. Luper and John R. Sundberg, doing business as Luper & Sundberg, Avon, Ill., a partnership
Filed May 31, 1960, Ser. No. 32,979
2 Claims. (Cl. 287—54)

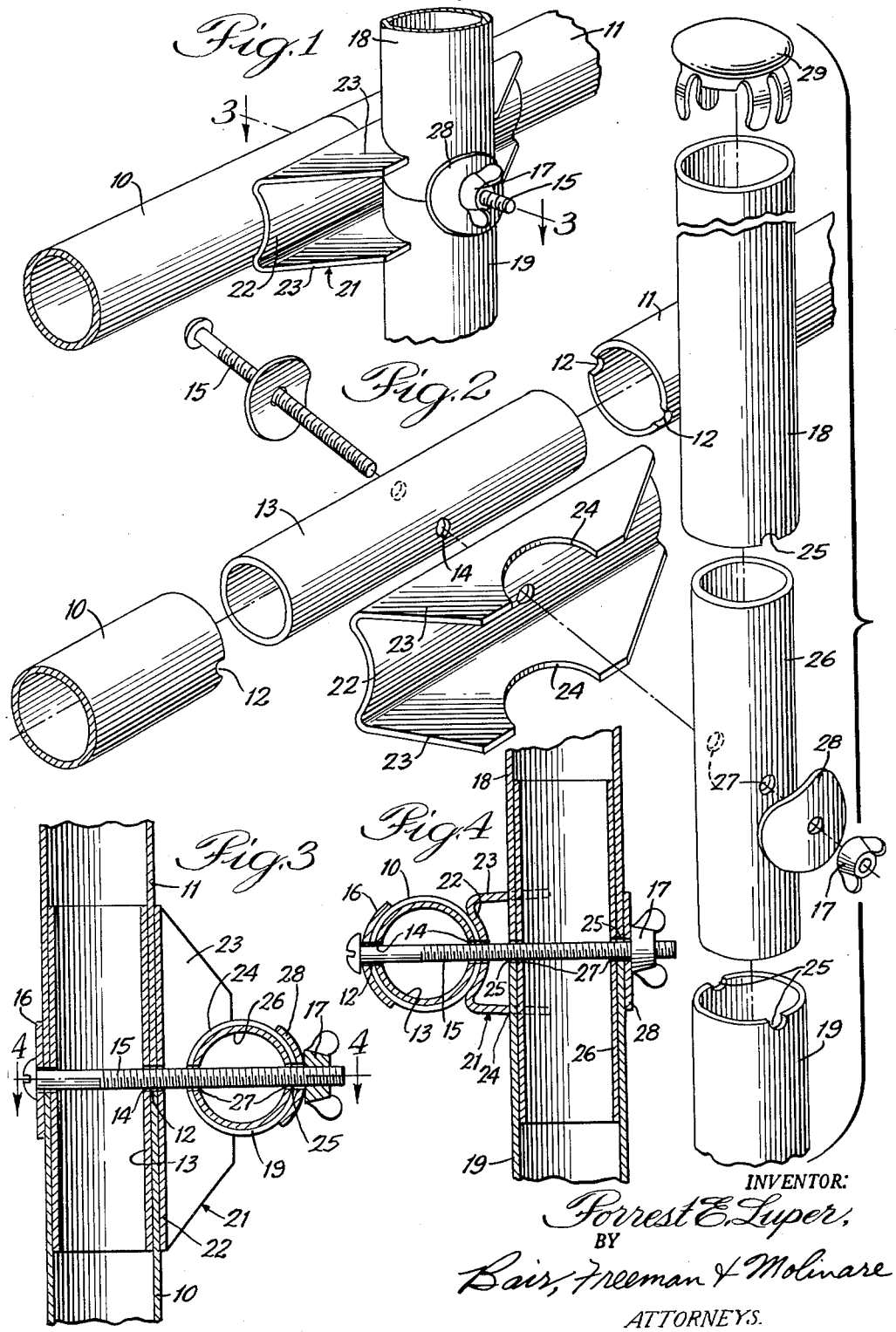

This invention relates to a joint structure for tubing and more particularly to a structural joint for assembling tubing or pipework into a framework.

Many types of temporary or permanent structures or frameworks are conventionally formed of tubing or piping. For example, it has been proposed to use light metal tubing such as aluminum tubing for erecting various types of frameworks or similar structures for numerous household uses.

One of the major problems in the erection of such frameworks or the like is the provision of a joint between adjacent tubing elements which can be assembled easily without the use of tools and which will hold the tubing elements securely in an assembled position. It is the primary object of the present invention to provide a joint structure of this character.

Another object is to provide a joint structure for tubing which secures tubing elements in end to end alignment with each other and may also secure tubing elements at right angles to each other.

According to a feature of the invention a plug, which is preferably in the form of a sleeve, is slidably fitted into the adjacent ends of aligned tubing elements overlapping the joint therebetween and connector plates overlap the joint on diametrically oppposite sides of the tubing elements and are secured tightly together, preferably by a bolt and wing nut, to hold the parts assembled. For securing tubing elements at right angles to the first-named elements one of the connector plates may be formed with notched flanges to receive a second tubing element which is held in place by the same fastening means.

The above and other objects and features of the invention will be more readily apparent from the following description in which:

FIGURE 1 is a partial perspective view of a joint structure for tubing embodying the invention;

FIGURE 2 is an exploded view of the tubing elements of FIGURE 1;

FIGURE 3 is a section on the line 3—3 of FIGURE 1; and

FIGURE 4 is a section on the line 4—4 of FIGURE 3.

The joint structure as shown in the drawing is adapted to secure two tubing elements, 10 and 11, in aligned end to end relationship with each other and may also be utilized to secure additional tubing elements at right angles to the tubing elements 10 and 11 as described hereinafter. As best seen in FIGURE 2, the tubing elements 10 and 11 are of the same uniform diameter and are formed at the ends thereof which are to abut in the joint structure with notches 12 diametrically aligned therein and together defining an opening diametrically through the tubing elements when they are assembled. An elongated cylindrical plug 13 preferably in the form of a sleeve or tubular section of slightly smaller external diameter than the internal diameters of the tubing elements 10 and 11 is adapted to fit slidably into the ends of the elements 10 and 11 and to span the joint therebetween. The plug or sleeve in 11 is formed centrally of its length with aligned openings 14 therein to receive a fastening device as described more fully hereinafter.

The tubing elements 10 and 11 are assembled in end to end relationship over the plug or sleeve 13 with the notches 12 in the ends of the tubing elements aligned with the openings 14 in the sleeve or plug. To hold the parts assembled a bolt 15 is extended through the aligned notches and openings and carries a connector plate 16 curved to fit closely against the external surfaces of the tubing elements 10 and 11 and to span the joint therebetween. The bolt may extend through a connector plate at the diametrically opposite side of the tubing elements and may receive a wing nut 17 to draw the connector plates tightly against the tubing elements and to secure them frictionally together and to the plug 13. It will be seen that this joint structure can be assembled very easily and quickly without the use of any special tools and when assembled will hold the tubing elements securely in alignment with each other.

In the construction shown additional tubing elements 18 and 19 are adapted to be secured in end to end relationship with each other and at right angles to the tubing elements 10 and 11.

For this purpose the last mentioned connector plate is in the form of an elongated channel strip 21 whose web 22 is concavely curved on its outer surface to fit closely against the outer surfaces of the tubing elements 10 and 11. The channel strip has flanges 23 which are formed in their edges with aligned semi-circular notches 24 in which the tubing elements 18 and 19 may fit. The tubing elements 18 and 19 are formed with notches 25 in their ends similar to the notches 12 in the elements 10 and 11 and are adapted to fit telescopically over a plug or sleeve 26 similar to the sleeve 13 and which is formed with diametrically opposite openings 27 therein. The bolt 15 passes through the openings 27 and the notches 25 so that the joint between the tubular elements 18 and 19 will lie between the flanges 23 of the connector plate 21. A connector plate 28 similar to the connector plate 16 fits over the outer surfaces of the tubular elements 18 and 19 and the wing nut 17 presses against this connector plate to draw all of the parts tightly together.

With this construction it will be seen that a single fastening, which may be assembled without the use of any tools, will hold four separate tubular elements in alignment with each other in pairs and with the pairs arranged at right angles to each other. By selecting tubular elements of the proper length it will be seen that with the joint structure of the present invention substantially any desired type of framework can be constructed easily and quickly to serve either as a temporary or a permanent framework. Where one of the tubular elements is to serve as a post or the like its end is preferably closed by a spring plug 29 as shown in FIGURE 2 so that it will present a smooth end surface. It will be understood that such springs plugs may be used where desired to eliminate raw ends of tubing.

While one embodiment of the invention has been shown and described in detail, it will be understood that this is for the purpose of illustration only and is not to be taken as a definition of the scope of the invention, reference being had for this purpose to the appended claims.

What is claimed is:

1. A joint structure for combining a plurality of pairs of tubular elements with each pair in abutting end-to-end relationship and with one pair transverse to the other pair, a notch at opposite ends of a diameter line of each of said tubular elements and at the abutting end of each tubular element, an elongate plug fitted slidably into the ends of each pair of said tubular elements and carrying an elongate fastening element adapted to be received in said notches, diametrically opposite connector plates adapted to be engaged adjacent opposite ends of said fastening element with said tubular elements therebetween and spanning the joint of each pair, said plates being shaped to fit closely against the surfaces of the tubular elements and a channel member between said pairs of tubular elements having a pair of flanges with aligned notches for straddling engagement with one pair of tubular members and a concave web surface transverse to said one pair for engagement with the other pair of said tubular members.

2. A joint structure for combining a pair of tubular elements in abutting end-to-end relationship, a notch at opposite ends of a diameter line of said tubular elements and at the abutting end of each tubular element, an elongate plug fitted slidably into the ends of said tubular elements and overlapping said abutting ends, an elongate fastening element adapted to be carried by said plug and to be received in said notches when said plug is inserted in the ends of said elements and said elements are in end-to-end abutment, and a pair of contoured plates each adapted to be carried adjacent a respective end of said fastening element and movable axially thereon for frictional engagement against opposite sides of said tubular elements.

References Cited in the file of this patent

UNITED STATES PATENTS

| | | |
|---|---|---|
| 113,530 | King | Apr. 11, 1871 |
| 1,420,670 | Schuette | June 27, 1922 |
| 1,483,602 | Bloss et al. | Feb. 12, 1924 |
| 1,986,028 | Terry | Jan. 1, 1935 |
| 2,326,941 | Heitner | Aug. 17, 1943 |
| 2,858,153 | Petersen | Oct. 28, 1958 |

FOREIGN PATENTS

| | | |
|---|---|---|
| 573,229 | Great Britain | Nov. 12, 1945 |
| 559,211 | Canada | June 24, 1958 |